Figure 1:
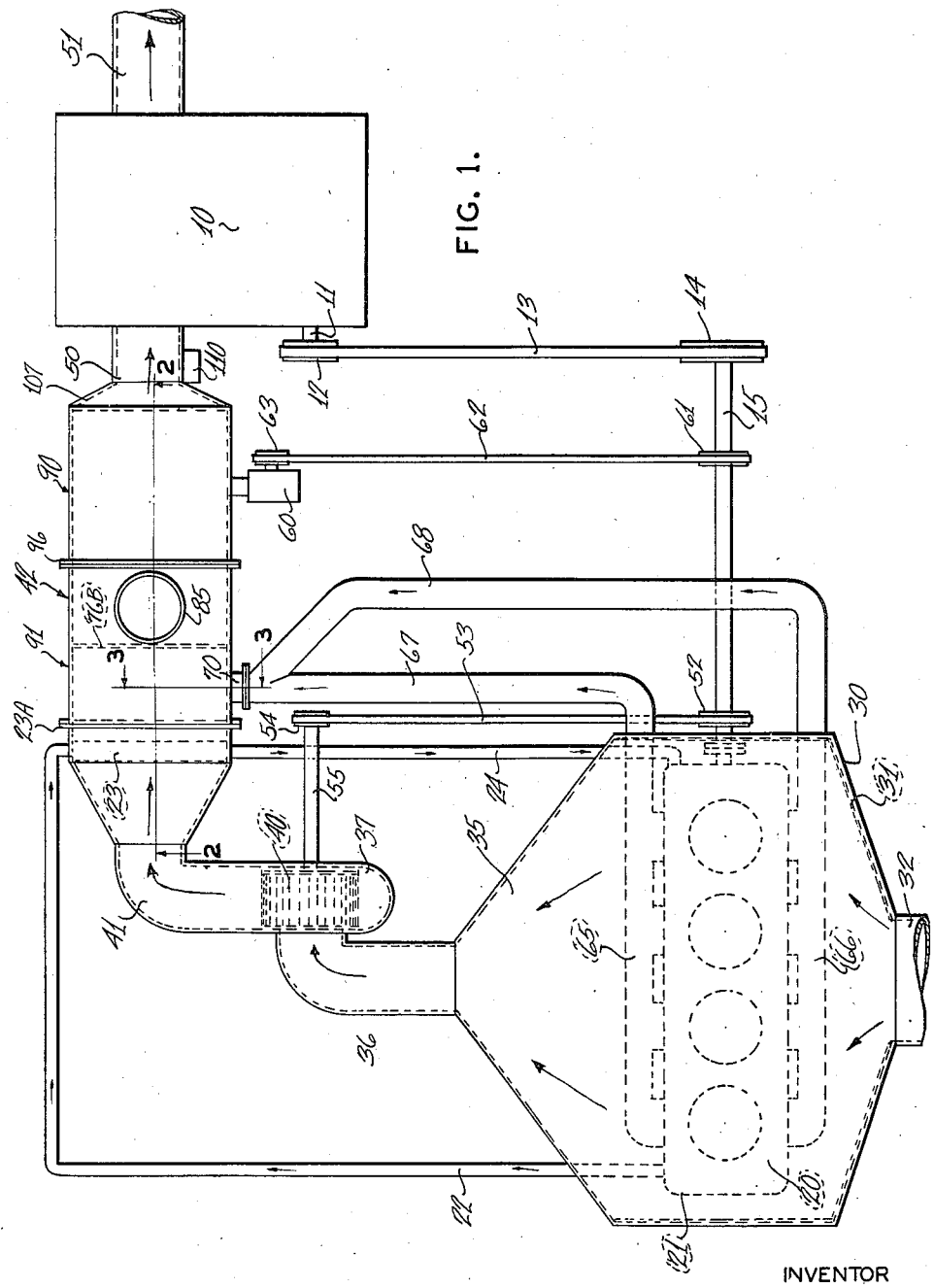

May 14, 1940.   R. D. WILLIAMS   2,200,379
UTILIZATION OF WASTE ENGINE HEAT
Filed April 4, 1938   2 Sheets-Sheet 1

INVENTOR
ROBERT D. WILLIAMS
ATTORNEY

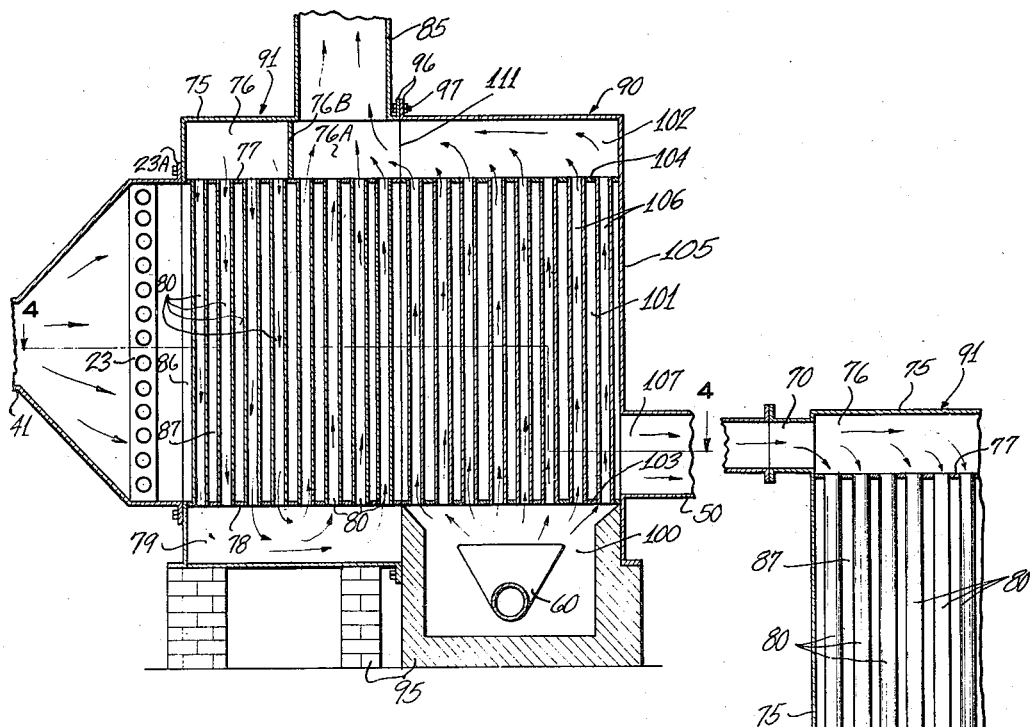
FIG. 2.
FIG. 3.
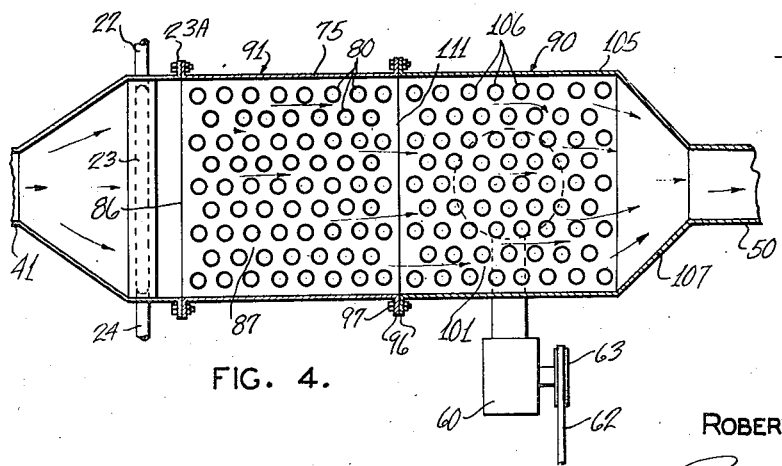
FIG. 4.
INVENTOR
ROBERT D. WILLIAMS
BY Paul L. Keehn
ATTORNEY Patented May 14, 1940

2,200,379

UNITED STATES PATENT OFFICE 2,200,379

UTILIZATION OF WASTE ENGINE HEAT

Robert D. Williams, Memphis, Tenn., assignor to Fairbanks, Morse & Co., Chicago, Ill., a corporation of Illinois Application April 4, 1938, Serial No. 199,821

3 Claims. (Cl. 19—39)

This invention relates to improvements in utilization of waste engine heat, and more particularly to improved methods and apparatus for thermally conditioning certain solid materials while in process of mechanical treatment. The invention is particularly identified with an improved utilization of heat from the prime mover, such as an internal combustion engine, employed as a source of mechanical energy for processing such materials.

In many of the arts and industries it is advantageous to treat a material as by heating or drying, incident to the mechanical processing, cleansing, finishing, calendering, or otherwise mechanically altering the dry material. An example is found in the ginning of cotton, wherein it has been determined that artificial drying of the seed cotton to remove an undesired excess of moisture, makes it possible to handle freshly harvested cotton in a manner to increase the quality of the baled cotton, and very importantly, the heat treating and drying process serves to facilitate the ginning treatment, as well as to permit the cleaners, extractors and feeders of the gin, to operate more smoothly and more effectively. It is also thought that the germination and milling qualities of the seed are enhanced by controlled drying of the cotton just prior to or during the ginning process. Furthermore, a controlled and efficient drying of the cotton facilitates the cleaning process in the sense of conducing to more economical operation of the cleaning equipment and by increasing its efficiency. This is due to the fact that removal of trash from the seed cotton is relatively easier when the cotton and foreign matter are both comparatively dry. It is accordingly to the attainment of a more efficient drying process and a reduction of the expense thereof, that the present invention is primarily directed.

Another object of the invention, more particularly stated, consists in the utilization of heat, for the purpose of effecting the drying of cotton incident to ginning thereof, from either or both the exhaust and cooling water of an internal combustion engine utilized as the prime mover for the cotton gin. By the practice of this method and the utilization of the improved apparatus for the purpose, the overall efficiency of the entire ginning plant, and the efficiency of the engine, are obviously considerably enhanced.

Incident to the foregoing it is within the purview of the present invention and is stated as an object thereof, to provide for means utilizing the waste engine heat at least in substantial proportion, for maintaining a stream of air for cotton drying, at a substantially constant temperature.

Yet another object of the invention is attained in a method of and provision for automatically controlling the drying air temperature, and yet varying the desired range of automatic control of air stream temperature, as in drying cotton and other material, whereby to care for changes in ambient temperature and relative humidity. According to the method and apparatus contemplated as within the present objects, the system, although under instantaneous control as by a thermostatic device, is nevertheless subject at any time to operator control to adjust or compensate for changes in atmospheric conditions, such as temperature and humidity.

Yet another object of the invention is attained in a series of heat exchange devices which are correlated in design and functionally unified by their connection into a common hot air supply system, the units being supplied with heat from an internal combustion engine or the like, and this engine being employed as a source of mechanical power for ginning the cotton while subject to thermal treatment, as by a warm air stream conducted through a duct system.

Still another object of the invention is attained in a device for some or all of the purposes aforesaid, and which may be easily utilized for the incidental purpose of ventilating the power plant enclosure and gin-enclosing structures, or a common housing therefor.

The foregoing and numerous other objects will appear from the following detailed description of a presently preferred embodiment of the invention, when considered in connection with the accompanying drawings, in which:

Fig. 1 is a top or plan view, partly diagrammatic in nature, of the various elements in an engine waste-heat recovery system, utilized in combination with a cotton ginning plant powered by an internal combustion engine; Fig. 2 is a vertical longitudinal section of an assembly embodying as a unitary structure, a combined radiator, exhaust-heat exchanger and air furnace, the plane of this section being indicated by line 2—2 of Fig. 1; Fig. 3 is a staggered transverse vertical section through a portion of the device of Fig. 2, and as taken along line 3—3 of Fig. 1, and Fig. 4 is a broken horizontal section as viewed along line 4—4, of the device shown by Fig. 2.

Referring now by characters of reference to the drawings, there is selected for exemplification of the invention, a cotton gin 10 which may be of any suitable or known type, and which is not illustrated in detail since the ginning equipment per se, forms no part of the present invention. It is however contemplated that the present invention may be applied not only to the drying of seed cotton prior to its actual mechanical treatment in the gin, but also may be utilized as a source of heated air for use in air-blast gins wherein a stream of air under substantial velocity is directed to one or more, usually a plurality, of air-blast nozzles serving continuously to force streams of air substantially across the periphery of the gin saws. This specific mode of utilization of an air-blast in connection with a rapidly rotating gin saw, may be, for example, such as disclosed in U. S. Patent No. 1,827,183 issued October 13, 1931 to C. A. Bennett. It will be understood for purposes of present description that the enclosure 10 contains suitable air-blast ginning equipment, with or without equipment suitable for pre-drying the cotton, i. e., thermally conditioning it prior to the time when the seed cotton is actually exposed to the gin saws and air-blast.

A power supply shaft 11 for the gin, is shown in Fig. 1 as actuated by a power pulley 12 driven, as by a belt 13, from pulley 14, secured to an engine drive shaft 15; the latter is conveniently installed as a countershaft, from which may also be driven several of the power-requiring accessories incident to the present process and system.

An engine 20 may be of Diesel type or may consist of some other suitable form of internal combustion engine of the power rating necessary to care for the power demands of the gin 10. The engine 20 may consist of a single cylinder engine, or of a multi-cylinder engine, as diagrammatically represented. It is, however, preferably water cooled, the jacket structure being indicated generally at 21 provided with a water circulating pump (not shown), and jacket discharge piping 22 which leads to a cooling water radiator 23, the water being directed therefrom as by return piping 24, leading to the cylinder block and jacket of the engine.

It is a preference in assembling the parts of the system, to provide the engine with an enclosing hood 30. This may be conveniently fabricated of steel sheet, and if desired, lined with a thermal insulating material 31 which serves the purpose of conservation of radiated heat, and in some measure as a deadening material for sound-proofing purposes. An air inlet to the hood 30 is shown at 32, and may have its entrance port at some desired point in the gin building or power plant structure, whereby to serve as may be desired, for ventilation purposes. An air outlet throat 35 is provided, to cause a convergence of the air stream after passing over the engine. The air is directed as indicated by the arrows in Fig. 1, across the engine 20, thence into the outlet throat of the hood. In the course of the air travel through the enlarged portion of the hood 30, the air stream will obviously be raised somewhat in temperature due to the effect of direct external radiation of the engine jacket. If, as is much less usual, an air-cooled engine be employed, the radiator 23 and jacket 21 would of course be omitted, in which case the direct engine radiation into the incoming air stream would obviously be at a much higher value.

The radiator 23 may be of any suitable or usual type, either of tubular form, of cellular type, or of tube and fin type, the particular form of the radiator not being material, except that its design should be such as to minimize resistance to the air stream passing therethrough, via the duct elements later to be described. It will have appeared as obvious that the air stream is still further raised in temperature by direct heating effect of the radiator on the air as it is impelled across the hot surfaces of the tubes or cells. It will further have appeared that when utilizing waste jacket heat from the engine, the radiator 23 being of a design, surface area and capacity to accommodate it to the air duct system hereinafter described, nevertheless the provision of such radiator is in lieu of the usual separate engine radiator.

The air stream in proceeding through the throat 35 converges into a duct 36, thence into the eye or inlet portion of a volute 37 of an air displacement device, such as a fan, blower or the like, indicated at 40. The exact form of air displacement device is not material to the invention, but a fan or blower of collodial type has been found economical and practical for the purpose noted. The outlet from the fan or blower 40 is connected into a duct section 41, thence through the radiator 23, and thence into the inlet air port hereinafter described, of a combined exhaust heat exchanger and air furnace unit, indicated generally at 42 (Fig. 1), the detail of structure of a suitable form of exchanger and furnace unit more clearly appearing in Figs. 2, 3 and 4, and later herein described more fully.

It is my preference that, for space economy and economy in length of duct, the radiator 23 be formed as a part of, or be supported by the shell of the unit 42. Such a support is arranged by flanged bracket elements 23A, which may be located within or exteriorly of the adjacent portion of duct 41, the brackets being in turn carried by the shell of the exchanger-heater unit 42.

As will later appear, the air stream from duct 41, after traversing the radiator, passes through the exhaust heat exchanger, thence through the air furnace, whether or not the latter is operating, and from the outlet or delivery port of the air furnace, into a duct 50 and into the gin enclosure 10, wherein there are provided the requisite number of branches for supply of the air blast nozzles of the gin, adjacent the gin saws, the latter structure not being illustrated. If necessary to care for the accumulation of air and slight increase in air pressure which might otherwise result in the gin structure 10, there is provided a discharge line or duct 51, leading to atmosphere as through a window of the enclosure about the power plant or the gin.

It has been found convenient to utilize the countershaft 15 as a drive for the fan or blower 40, as through a drive pulley 52, belt 53, driven pulley 54 and fan drive shaft 55. It has also been found convenient to utilize for purposes of external combustion, when necessary to augment the heat derived from the engine and radiator radiation, as augmented by the exhaust heat exchanged into the air circuit in the unit 42, an oil burner 60 which may be of a gun type or any other suitable form, advantageously utilizing the same type of fuel as that employed in engine 20, in case the latter is of Diesel type. The oil burner 60 is provided with the usual blower equipment (not shown) which is preferably electrically driven, but which may be power-driven by a pulley 61, belt 62 and pulley 63 (Fig. 1).

Proceeding now to a description of the combined radiator, exhaust heat exchanger and air furnace unit, the engine 20 is shown as provided with oppositely disposed manifolds 65 and 66, communicating respectively with exhaust pipes 67 and 68 both connected through a common pipe section, to exhaust gas inlet port 70 of the heat exchanger unit. The exhaust gas inlet port is identified with the inlet connection, and leads into the upper portion of the shell 75 about the exhaust heat exchanger, the location of the connection 70 best appearing in Fig. 3. The exhaust entrance connection leads into the upper chamber 76, defined as by a flue or tube sheet 77 and the upper end of the shell. A similar lower flue sheet 78 spans the wall of the exchanger shell slightly above the bottom thereof and forms a chamber 79 in the lower portion of the shell. It will appear from Figs. 2 and 3 particularly, that the hot exhaust gases entering the port and connection 70, pass thence into the chamber 76, thence downwardly through certain of the plurality of parallel vertical spaced tubes 80 in the exchanger, thence into the lower chamber 79, thence upwardly and outwardly through other of the tubes 80, thence into chamber 76A, and out through exhaust stack 85, and to atmosphere. A partition 76B, between the chambers 76 and 76A, thus compels the exhaust gases to traverse the tube assembly of the exchanger in both a downward direction and an upward direction.

The air circuit through the exchanger is provided by an inlet port 86 at the terminus of the duct just beyond the radiator, and extends throughout the intermediate space 87 in the shell of the exchanger in such manner that the air circulates closely about the tubes, and after being substantially heated by radiation from the exhaust gases, makes its exit into the air circuit of the air furnace, the latter portion of the unit being indicated generally at 90, to distinguish it from the exhaust heat exchanger portion of the unit, indicated generally at 91.

The furnace 90, as will appear from Figs. 2 and 4, is by preference, constructed as a companion unit to the exhaust heat exchanger. Each of the structures 90 and 91 is preferably of vertical tubular type as shown, each of rectangular transverse section (Fig. 4) and the units are assembled in back-to-back relation. This arrangement facilitates removal of either unit without structural disturbance of the other, as for repairs, replacement or service attention. In the event of the removal of either unit for such purpose, the open side remaining as a result of the disassembly, may be temporarily closed as by a flat metal sheet of suitable gauge (not shown), bolted in place as a closure on the remaining unit. Temporary connections may be effected, in such event, in an obvious manner. It may be noted as a preference that a single base structure 95 is provided for the assembly of units 90—91, and that such base structure is itself formed as a rigid unit common to the exchanger-furnace assembly. This conduces to structural stability, and the contiguous assembly of the units 23, 90 and 91, provided for by the radiator location, and by companion flanges 96 and bolts 97, assures a minimum length of travel of the hot air stream between the radiator and exchanger, also between the exchanger and furnace, minimizes heat loss between the several units, minimizes length of duct required, besides assuring compactness of assembly. This latter point is of advantage in the event of installation of the present heat conservation system in existing ginning structures, wherein power plant space is often at a premium.

Proceeding now with a discussion of the air furnace 90, the latter is conveniently constructed internally closely after the manner of the unit 91, being provided with a lower combustion compartment 100, an intermediate compartment 101 about the tubes or flues, and an upper compartment 102, which is or may be in connection with chamber 76A of the heat exchanger. Flue or tube sheets or the like are shown at 103 in the lower portion and 104 in the upper portion of the shell 105. The combustion takes place in obvious manner as in the chamber 100, the products of combustion passing through the tubes 106, thence into the upper chamber 102 and out through the combined exhaust and flue stack 85 to atmosphere.

Although an oil burner is suggested as a source of external combustion for augmenting the waste heat to be imparted to the air stream, it is obvious that any other suitable or usual source of heat may be employed, although by great preference, there is utilized some form of combustion apparatus susceptible of automatic control, as by a thermostat 110, the thermally responsive elements of thermostat 110 being located within the duct 50 and hence responsive to the temperature of the air stream therein. The thermostat 110 is most desirably of a type susceptible of manual regulation of its range, and of a sensitivity such as to be responsive to changes above and below, say a range of three degrees from the actual setting, the latter being determinable of course at will, by manual regulation.

The air circuit through the furnace unit 90 is confined to the chamber 101 between the flue sheets or headers 103, 104, being the space about the tubes 106. An air entrance opening is provided through a common planar partition structure, optionally utilized but not illustrated, the location being shown at 111. This partition may be confined merely to the external flanges by which the two units are structurally connected in assembly, in which case, and as shown (Fig. 2), the air circuit through both the tube compartments, is uninterrupted, and the hot air proceeds outwardly from the compartment 101, directly into a transfer or distribution chamber 107, discharging into the duct 50, thence into the gin enclosure 10 or by way of suitable branches (not shown) to the air blast nozzles adjacent the gin saws.

The course of the air through the system and the several units thereof as described, and the operation of the system as a whole are thought to have been fully apparent from the description of parts and their individual function, but it will be noted that, in the event the heat derived from the engine, whether from direct radiation, thermal emission by the radiator, or through the exhaust heat exchanger or any thereof be sufficient to avoid any necessity for augmenting the heat content of the air stream, the furnace is, for reasons of economy, obviously the first unit to be dispensed with in operation.

It will have appeared that, irrespective of whether or not the air furnace is operative, the air stream in traversing the hood 30 is first raised somewhat in temperature above the ambient, by direct radiation from the engine 20, which it will be assumed is in operation to drive the shaft 15, the accessories connected thereto, and the pin equipment proper. After the air stream passes the fan or blower, then traverses the water radiator 23, assuming the engine to be operating at full-load or a substantial proportion of full-load, the air will be further raised in temperature to an extent depending in great measure upon the outside or ambient temperature, and in perhaps a majority of cases, to a temperature of 150–160 degrees F. representing approximately the optimum temperature range for most efficient drying effect of the cotton. The air stream, in proceeding through conduits 36 and 41 under propulsion by the fan or blower 40, is conducted through the radiator and into the exhaust heat exchanger 91, whereupon due to exposure to the hot tubing surfaces in the air circuit of the exchanger, it is still further raised in temperature. The thermostat 110, as before noted, determines whether or not the oil burner 60 will be in operation at any given time, depending upon whether or not the air stream in the duct system has attained that temperature sufficient to satisfy the thermostat in its then-existing setting. Whether or not the oil burner is in operation, the air stream will traverse the heating chamber or air circuit within the air furnace, thence by way of duct 50 into the gin, cotton dryer, or in part or whole, directed to the air blast nozzles associated with the ginning equipment.

It will have appeared from the foregoing description that the blower 40 in the location shown by Fig. 1, serves as an induced draft fan in impelling the air through the hood 30 but operates as a blower through the radiator and other portions of the duct system beyond the fan. It is obvious that the blower may be located in other positions than as shown in the duct system, and in relation to the several items of apparatus; for example, it may be located at or near the inlet 32 or ahead of radiator 23, or even beyond the assembly 90—91, all without departure from the essentials of the present invention.

It is preferred, in normal operation of the system that the temperature of the drying air be held within a range of 150–160 degrees F. particularly for cotton handled during the early part of the ginning season. Assuming by way of example, conditions of 70 degrees F. outside temperature, at 75% relative humidity, a dryer efficiency of 35%, and a cotton moisture content in excess of 12% by weight, the temperature of 150–160 degrees F. will serve to extract about three pounds of moisture from each one hundred pounds of seed cotton, and thus reduce the moisture content of the cotton to bring it within limits ordinarily acceptable. Assuming an air velocity of the order of 700—800 feet per minute in the heaters 90—91, and assuming a total air volume of the order of 5,000 cubic feet per minute, by far the greater portion of heat required to raise the drying air temperature to say 150 degrees F., is available from the radiator with but slight, if any, modification of a standard equipment radiator to adapt it for use in the present system. It will thus appear that the major part of the heat transmitted to the air stream is provided by the radiator or some comparable cooling unit, this heat being augmented, when and if necessary, to attain the desired temperature of the air stream, by the heat derived from the engine exhaust, through the unit 91. It is thus seen that a highly efficient heating system for cotton drying purposes, is attained by the utilization of substantially all of the engine waste heat. It is further to be noted, as has been determined from experiments and uses in the field, that in ordinary ginning practice, an internal combustion engine of either single cylinder or multicylinder Diesel type, say of 120 H. P. rating, will serve, upon recovery and utilization of its waste heat in accordance with the present invention, to supply of itself sufficient waste heat values to care for the drying of the cotton incident to the ginning thereof. It will appear from this fact that the principal source of the drying heat, and very often the sole source thereof, is the engine itself, whereas the air furnace such as 90, may be dispensed with, occasionally through long periods of operation, and at other times is required only as a supplemental or auxiliary source of heat.

It is important to note that the system and method of operation identified with the present invention, provide for maintaining the air for cotton drying at a substantially constant temperature. Obviously the heat emitted by the radiator and exhaust heater, is dependent greatly upon a fluctuating condition of engine loading, and is therefore variable. For the purpose of equalizing such occasional variations in engine waste heat, the thermostat 110 is provided, under the influence of which the air heater or furnace is available as a standby unit, for example during a starting or warming up period, or whenever necessary to augment the engine waste heat to bring the air stream to the minimum temperature necessary for drying purposes, for example, 150–160 degrees. Whenever the heat supplied by the cooling water and exhaust is inadequate to bring the air stream to this temperature the thermostat will function to start the burner to make up whatever deficiency may exist. It is a preference that the thermostat be so arranged as to shut the burner off, or at least to reduce its burning rate materially, whenever the temperature of the air stream reaches say 150 degrees F. The usually preferred temperature range of 150–153 degrees F. is however by great preference, subject to manual change by the operator, at any time.

It will have appeared that the system as described is exceedingly flexible as to the range of heat supply. Obviously the radiator heat may be used alone, as a sole thermal source for the drying air stream. The next greater stage of heat supply would consist in utilizing engine and radiator heat, together with the exhaust exchanger, and a still greater supply is obtainable through the use of these elements together with the air furnace or heater.

It will be noted that all of the several heating elements characterizing the present system are comparatively inexpensive, and may be assembled as a compact unit in the immediate vicinity of the engine, usually within the engine room, so as to be readily accessible to the ginner at all times. Furthermore, the two major waste-heat recovery units, viz., the radiator 23 and exhaust heat exchanger 91, do not of themselves add any additional elements to the system, the present practice consisting merely, in most instances, of utilizing a standard radiator in the duct system to adapt it for the present purpose. Since some form of exhaust pot, muffler or silencer is almost invariably provided with the engine, these more conventional elements become unnecessary since their function is performed by the present exhaust exchanger which serves efficiently as a silencer. Furthermore, the formerly prevailing practice of utilizing a distinct radiator fan, is obviated by using the fan or blower 40, serving the dual purpose of a radiator cooling fan and an impelling agency for moving the air through the ducts and units of the system.

As has been briefly mentioned heretofore, the heating system characterizing the present invention, provides admirably for ventilation of the ginning plant. To this end, the radiator may be disposed within the engine room, as may the exhaust heat exchanger and any other or all of the elements referred to. Since the fan has, in most instances, a capacity of about 5,000 cubic feet per minute, this amount of air is taken by the system from the interior of the plant, is forced through the heating system and discharged to the atmosphere through the dryer or gin. The air intake may be through an open window, door or other opening in the ginning plant structure.

It will have appeared from the foregoing description that the method and apparatus within the invention serve fully to attain each of the objects specifically stated hereinabove, as well as the numerous advantages implied from the later description.

Although the invention has been described by making specific reference to a preferred and inclusive combination and an advantageous arrangement of mechanically and thermally related elements, it will be understood that numerous changes may be made in the elements, as well as in their arrangement, and further in the utilization of numerous sub-combinations of the items of apparatus disclosed, all without departing from the full intended scope of the invention as defined by the appended claims.

I claim as my invention:

1. In combination with cotton-ginning apparatus, an internal combustion engine of water-jacketed type, connected as a prime mover for the gin, means for thermally conditioning the cotton incident to the ginning process, and including devices utilizing waste jacket and exhaust heat derived from the engine as a source of thermal energy for said conditioning means, the waste-heat-utilizing means further including an air conduit embodying means for radiating heat externally dissipated by the engine into an air stream in said conduit, and means for displacing the air thus heated to the zone of its application to the cotton, incident to the ginning process.

2. In combination with a cotton gin, an internal combustion engine, means for translating the engine power for operation of the gin, means for air-heating the cotton incident to the ginning process, said means including an air duct constituting an enclosure for the engine, an exhaust heat exchanger in said duct, and connected to the engine as a source of heat, and means for displacing a current of air through the duct and heat exchanger, and to a zone adjacent the cotton gin.

3. In a system for the combined ginning and drying of cotton or the like, an internal combustion engine connected as a prime mover for the cotton gin, an air duct system directed to the gin, including a portion extending about the engine for recovery of heat externally radiated therefrom, an engine-heat-dissipating agency in said duct, and a heater of external combustion type having an air circuit in said duct and operable in thermostatic response to any requirement for makeup heat in said duct sufficient to maintain the air stream at a predetermined temperature in accordance with drying requirements of the cotton while in process of ginning.

ROBERT D. WILLIAMS.